July 16, 1940.   H. S. WHITE   2,207,963
FLY SWATTER
Filed Dec. 3, 1938
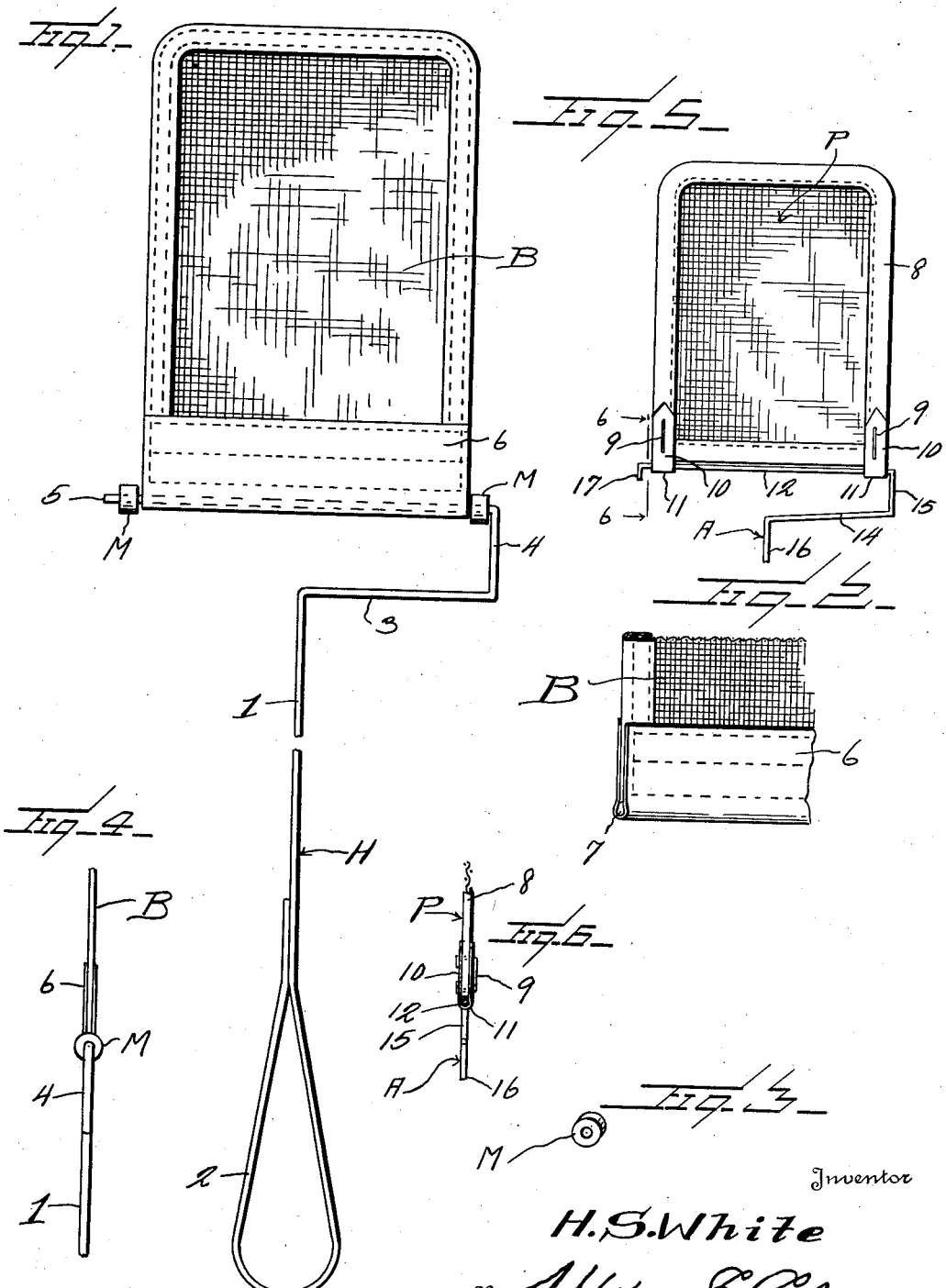
Inventor
H. S. White
By Watson E. Coleman
Attorney Patented July 16, 1940

2,207,963

UNITED STATES PATENT OFFICE 2,207,963

FLY SWATTER

Herbert S. White, West Aylmer, Ontario, Canada

Application December 3, 1938, Serial No. 243,847

6 Claims. (Cl. 43—137)

This invention relates to improvements in fly swatters, and it is an object of the invention to provide a device of this kind including a striker blade or pad together with an associated handle member and wherein said blade or pad and handle member are so constructed and arranged as to provide ready replacement of a new blade or pad when required.

The invention also has for an object to provide a device of this kind including a handle member provided at one end portion with a transversely disposed bar together with a striker blade or pad provided with means to permit the same to have swinging engagement with said bar and wherein the blade or pad is maintained in applied position by members mounted upon the bar and which members constitute bumpers to facilitate the effective use of the swatter.

The invention consists in the details of construction and in the combination and arrangement of the several parts of my improved fly swatter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view in top plan of a swatter constructed in accordance with an embodiment of my invention;

Figure 2 is a fragmentary view slightly in perspective of the lower corner portion of the blade or pad as illustrated in Figure 1;

Figure 3 is a view in perspective of one of the bumper members unapplied;

Figure 4 is a fragmentary view in side elevation of the adjacent portions of the handle member and blade or pad;

Figure 5 is a fragmentary view in top plan of a swatter constructed in accordance with another embodiment of my invention;

Figure 6 is a fragmentary view in side elevation of the device as illustrated in Figure 5, the line of section being substantially on the line 6—6 looking in the direction of the arrow.

As disclosed in the accompanying drawing, my improved swatter comprises a striker blade or pad B and a resilient handle member H together with the retaining members M for the blade or pad B and which members also constitute bumpers.

The handle member H, as herein disclosed, is produced from a single length of wire of requisite gauge and formed to provide a shank 1 of predetermined length with a loop 2 at one end portion thereof to provide a hand grasp. The opposite end portion of the shank 1 has extending laterally therefrom and entirely to one side thereof an arm 3 of desired length and which has its outer end portion continued by a forwardly directed extension arm 4. This arm 4 is comparatively short in length and has its outer end continued by the laterally disposed bar 5 which extends inwardly toward the shank 1 and is of a length to terminate a considerable distance beyond the side of the shank 1 remote from the extension arm 4. This bar 5 is also of a length to substantially extend equi-distances beyond opposite sides of the shank 1, and said bar 5 together with the extension arm 4, the arm 3 and the shank 1 are substantially coplanar.

The striker blade or pad B as herein disclosed is of desired configuration and dimensions and, as illustrated in the accompanying drawing, is formed from a screen fabric of predetermined mesh although I do not wish to be understood as limiting myself in this respect. The inner end portion of the blade or pad B is provided thereacross with a casing or sheath 6 open at both ends and through which is adapted to be directed the bar 5 whereby the blade or pad B and the handle member H are oppositely connected and in a manner to permit the blade or pad B to have swinging movement.

The blade or pad B is maintained in effective position upon the bar 5 by the members M of rubber or other yielding material. Each of these members M at its axial center is provided therethrough with an opening 7 whereby the member may be frictionally held to the bar 5.

As is illustrated in the accompanying drawing, there is a member M on the bar 5 at each side of the applied blade or pad B holding the blade or pad B against undue movement lengthwise of the bar 5 yet leaving said blade or pad B free for swinging movement.

It is also to be noted that the members M are of such diameters as to extend a material distance beyond the opposite faces of the blade or pad B when said blade is fully extended or substantially coplanar with the shank 1. These members, therefore, also act as bumpers to prevent injury to a surface which may be struck when swatting a fly and which injury might otherwise result from direct contact of the bar 5 or the associated casing or sheath 6 of the blade or pad B.

The members M can be readily applied or removed. This is of advantage because should a pad or blade B become unfit for use from any cause, the outer member M can be readily withdrawn and thus allow the substitution of a new blade or pad and after which such member M is returned to place upon the bar 5.

It is to be stated that it is intended that my improved swatter comprises a set including a handle member H and a number of blades or pads B.

In the embodiment of the invention as illustrated in Figures 5 and 6, the striker blade or pad P is of desired configuration and dimensions and formed from screen fabric of predetermined mesh. The marginal portions of the blade P are strengthened or reinforced by a selvage 8 of leather or other material as may be preferred.

The inner end of the blade P at the opposite side marginal portions thereof have secured thereto by the staples 9 or otherwise the loop members 10 which extend a distance beyond the inner end of the blade P. Each of these loops comprises an elongated strip of material of leather or of such other material as can be used to advantage and which has its end portions turned to overlie the opposite faces of the blade P with the folded portion of the strip extending slightly beyond the inner end of the blade P and coacting with said inner end of the blade to provide eyes 11 through which is freely disposed a laterally directed bar 12 carried by the outer end of a handle member A. This handle member A is also preferably formed of a single length of wire of requisite gauge and has extending from its outer end portion and entirely to one side thereof an arm 14 of desired length which is continued by a forwardly directed extension arm 15 of relatively short length. This arm 15 is continued by the laterally disposed bar 12 hereinbefore referred to and which extends inwardly of the arm 15 and is of a length to terminate a considerable distance beyond the side of the shank 16 of the handle member A remote from the short arm 15. The coaction between the loop members 10 and the bar 12 is such as to allow the striker blade or pad P to have free swinging movement with respect to the bar 12. This assembly also provides means whereby a blade or pad P may be readily removed and a new blade or pad substituted.

The blade or pad P is effectively maintained against displacement from the bar 12 by the perpendicularly disposed angular extension 17 which, as herein disclosed, is substantially parallel to the short arm 15. This extension 17 is of a length to offer no hindrance or obstruction to the desired application of a blade or pad P upon the bar 12.

It is to be stated that the applied loops 10 serve as pads or bumpers to prevent injury to a surface which may be struck when swatting a fly. However, if preferred bumpers such as M as used in connection with the first embodiment of the invention may be readily applied to the bar 12.

From the foregoing description it is thought to be obvious that a fly swatter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A fly swatter comprising a handle member including a transversely disposed bar at one end portion thereof, a striker blade having a casing at one end thru which the bar is directed, and bumper members on the bar at opposite sides of the blade for holding the blade in position upon the bar.

2. A fly swatter comprising a handle member including a transversely disposed bar at one end portion thereof, a striker blade having a casing at one end thru which the bar is directed, and bumper members on the bar at opposite sides of the blade, said bumper members being of yielding material.

3. A fly swatter comprising a handle member including a transversely disposed bar at one end portion thereof, a striker blade having a casing at one end thru which the bar is directed, and bumper members on the bar at opposite sides of the blade for holding the blade in position upon the bar, one of said bumper members being detachably engaged with the bar to permit a blade to be applied to or removed from the bar.

4. A fly swatter comprising a handle member consisting of a shank, a laterally disposed arm carried by one end portion of the shank and terminating in a forwardly directed arm, a laterally disposed bar carried by the outer portion of the second arm and extending toward and beyond the shank, a striker blade having a transversely disposed casing at one end portion through which the bar extends, and bumper members engaged with the bar at opposite sides of the blade to hold the blade in effective position upon the bar.

5. A fly swatter comprising a handle member including a shank, a laterally directed arm at the outer end of the shank and entirely to one side thereof, a forwardly directed short arm at the outer end of the first arm, a laterally disposed bar at the outer end of the short arm and extending toward the shank, and a pad freely engaged with said bar for swinging movement.

6. A fly swatter comprising a handle member including a shank, a laterally directed arm at the outer end of the shank and entirely to one side thereof, a forwardly directed short arm at the outer end of the first arm, a laterally disposed bar at the outer end of the short arm and extending toward the shank, a pad freely engaged with said bar for swinging movement, and means for association with the bar for holding the applied pad against displacement.

HERBERT S. WHITE.